(12) United States Patent  (10) Patent No.: US 8,847,099 B2
Scodeller et al.  (45) Date of Patent: Sep. 30, 2014

(54) MODULAR RESISTANCE WELD GUN

(75) Inventors: Rene B. Scodeller, Windsor (CA); Michael J. Renaud, Amherstburg (CA)

(73) Assignee: Doben Limited, Windsor (CA)

( * ) Notice: Subject to any disclaimer, the term of this patent is extended or adjusted under 35 U.S.C. 154(b) by 2457 days.

(21) Appl. No.: 11/625,477

(22) Filed: Jan. 22, 2007

(65) Prior Publication Data

US 2008/0173619 A1  Jul. 24, 2008

(51) Int. Cl.
*B23K 11/10* (2006.01)
*B23K 11/31* (2006.01)

(52) U.S. Cl.
CPC .................................. *B23K 11/314* (2013.01)
USPC ............................................. 219/89; 219/90

(58) Field of Classification Search
USPC ........... 219/74, 78.01, 86.1, 86.25, 86.61, 89, 219/90, 91.1, 120; 47/74, 78.01, 86.1, 47/86.25, 86.61, 89, 90, 91.1, 120
See application file for complete search history.

(56) References Cited

U.S. PATENT DOCUMENTS

| | | |
|---|---|---|
| 2,927,192 A | 3/1960 | Plummer |
| 3,562,483 A | 2/1971 | McMordie |
| 4,525,618 A | 6/1985 | Beneteau |
| 4,550,236 A | 10/1985 | Nakadate et al. |
| 4,551,605 A | 11/1985 | Numata et al. |
| 5,128,510 A * | 7/1992 | De Bruyn et al. ............... 219/89 |
| 5,239,155 A * | 8/1993 | Olsson ........................ 219/86.25 |
| 5,731,563 A | 3/1998 | Baustert |
| 6,596,958 B1 * | 7/2003 | Chase ......................... 219/86.25 |
| 6,723,944 B1 | 4/2004 | Angel |
| 6,870,121 B2 * | 3/2005 | Beauregard et al. ........ 219/86.25 |
| 6,875,945 B2 | 4/2005 | Knauff et al. |
| 6,911,616 B2 | 6/2005 | Kilabarda et al. |
| 7,067,760 B2 | 6/2006 | Porta |
| 2005/0023251 A1 * | 2/2005 | Porta .......................... 219/86.25 |

* cited by examiner

*Primary Examiner* — Brian Jennison
(74) *Attorney, Agent, or Firm* — Carlson, Gaskey & Olds, P.C.

(57) ABSTRACT

A resistance welding gun is provided that includes an arm assembly having spaced apart plates. First and second spaced apart blocks interconnect the plates and extend between the plates in a first direction. The first and second blocks are machined to provide a desired spacing between the plates. An electrode arm is arranged between the plates and blocks and supports an electrode end having a replaceable cap in one example. A clamping device applies a clamping load in a second direction transverse to the first direction to secure the electrode arm between the blocks. Lateral alignment between opposing electrode ends is achieved by a movable adjustment assembly on one of the arm assemblies. A pivot pin interconnects the block and electrode arm for permitting rotation of the electrode arm relative to the block. In one example, the adjustment assembly includes an adjustment member that is rotated to laterally move the electrode arm about the pivot pin in a desired position.

20 Claims, 4 Drawing Sheets

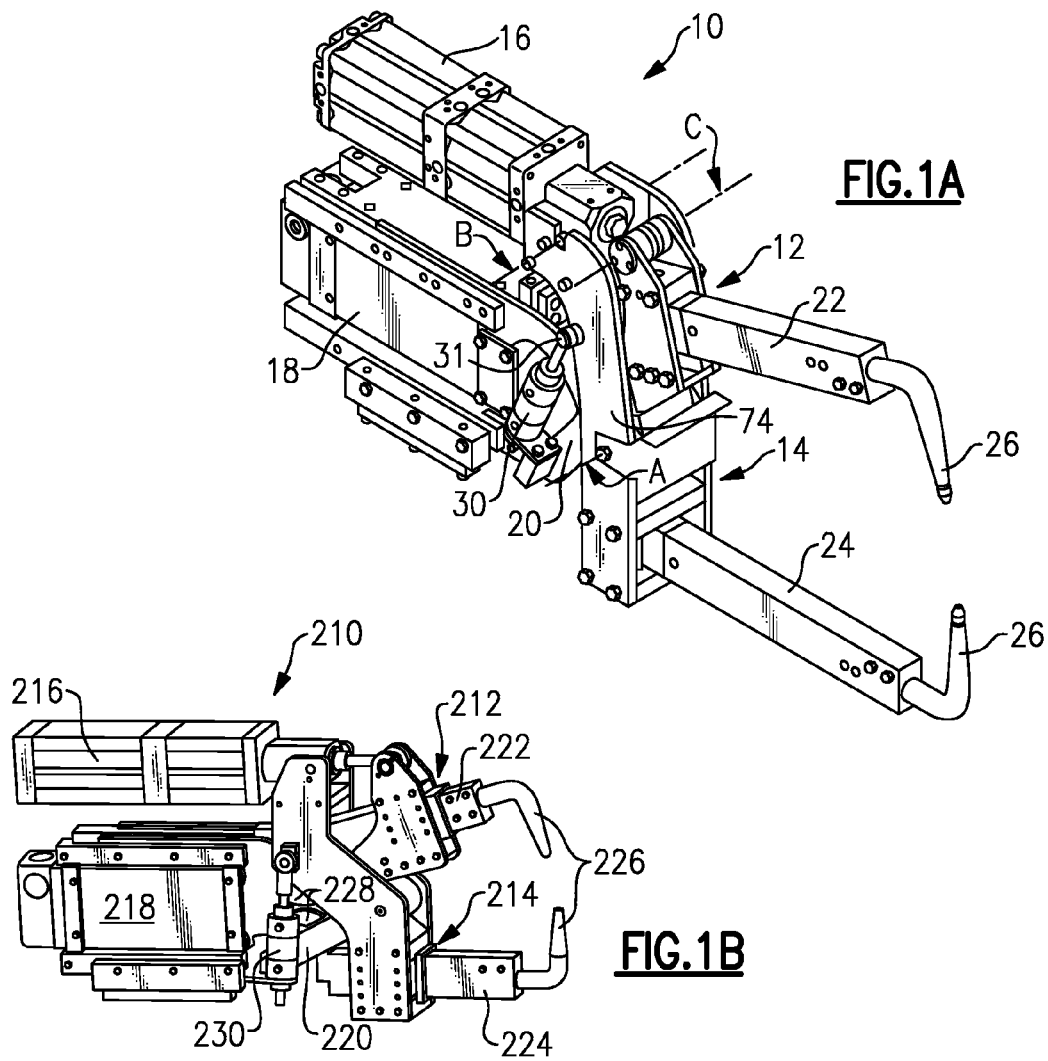
FIG.1A
FIG.1B
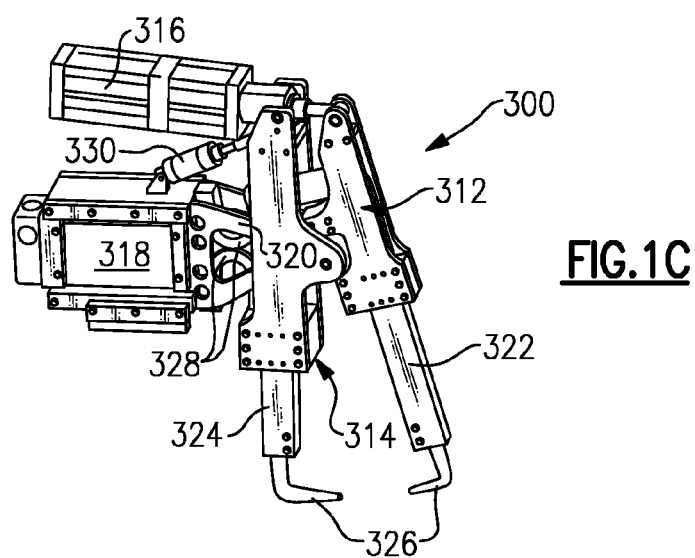
FIG.1C

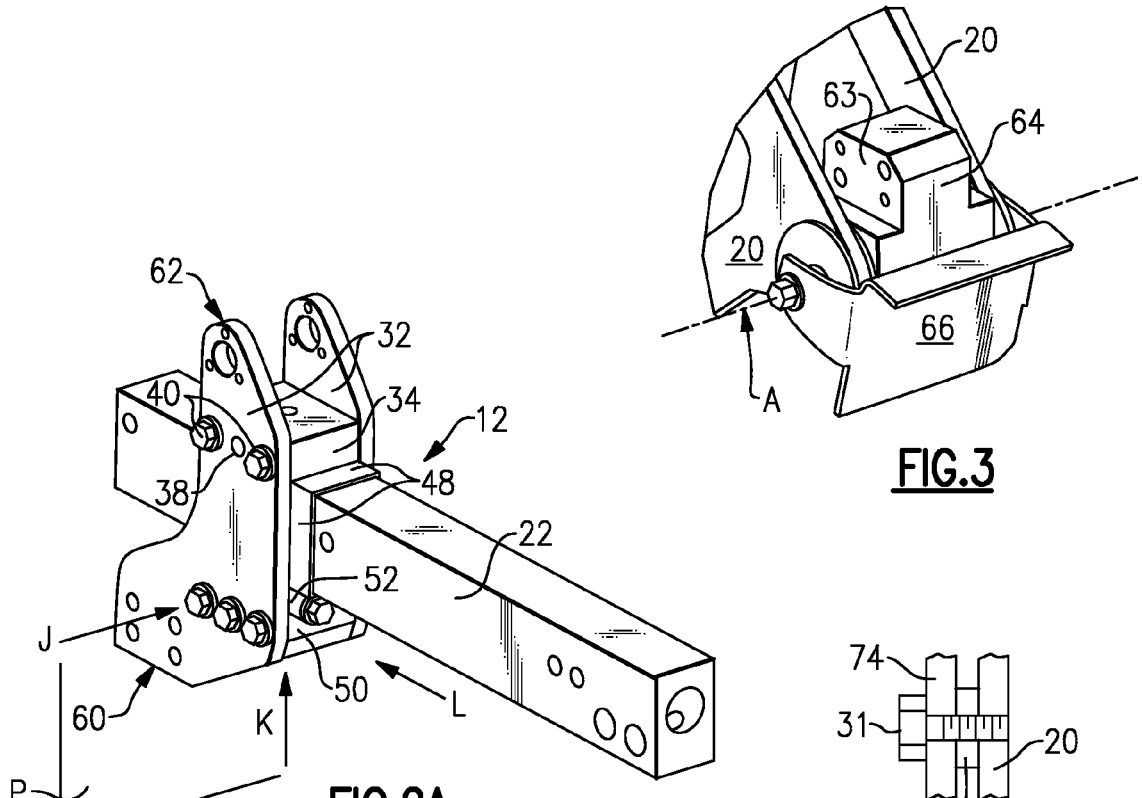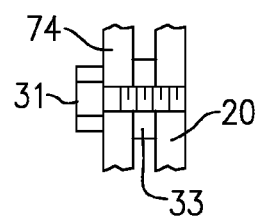
FIG. 3
FIG. 10
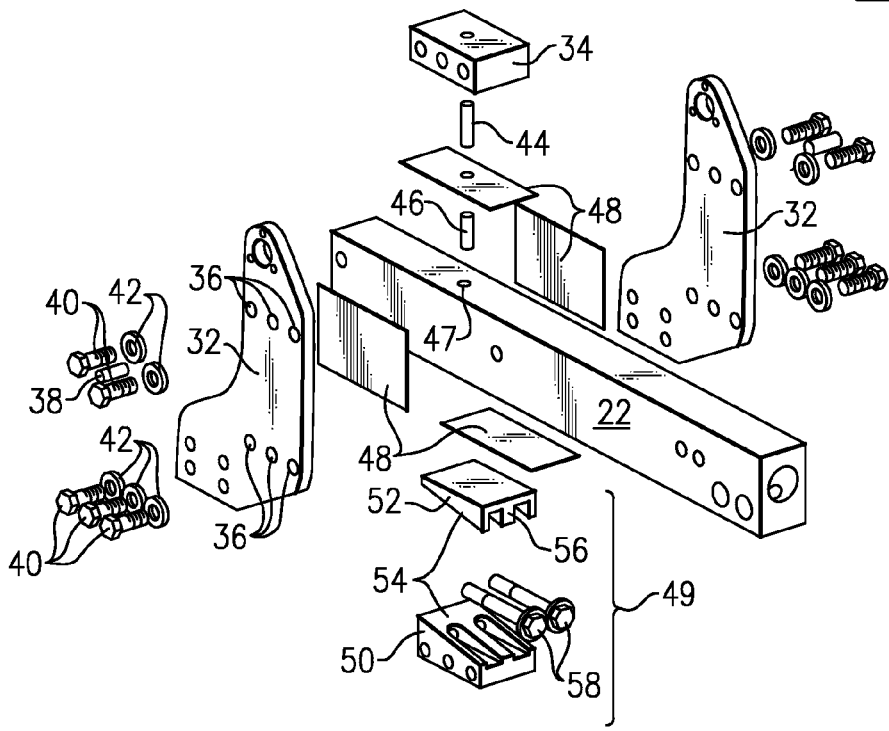

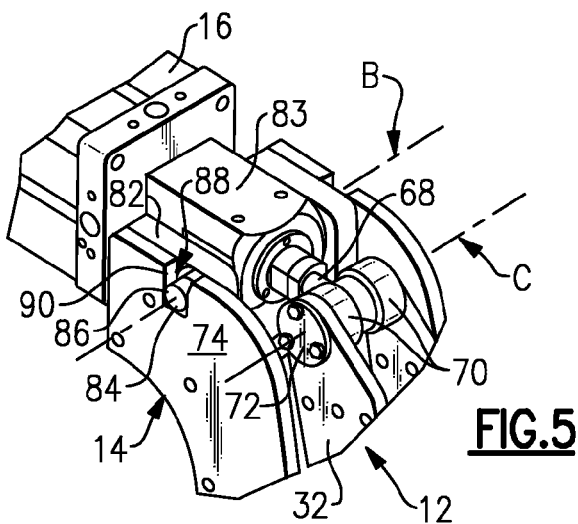
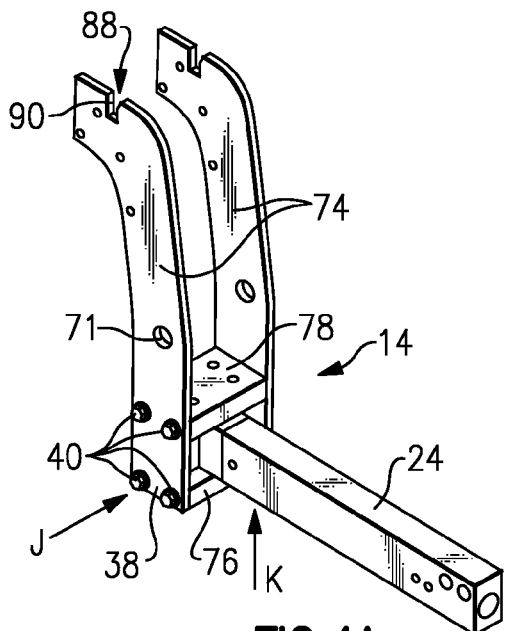
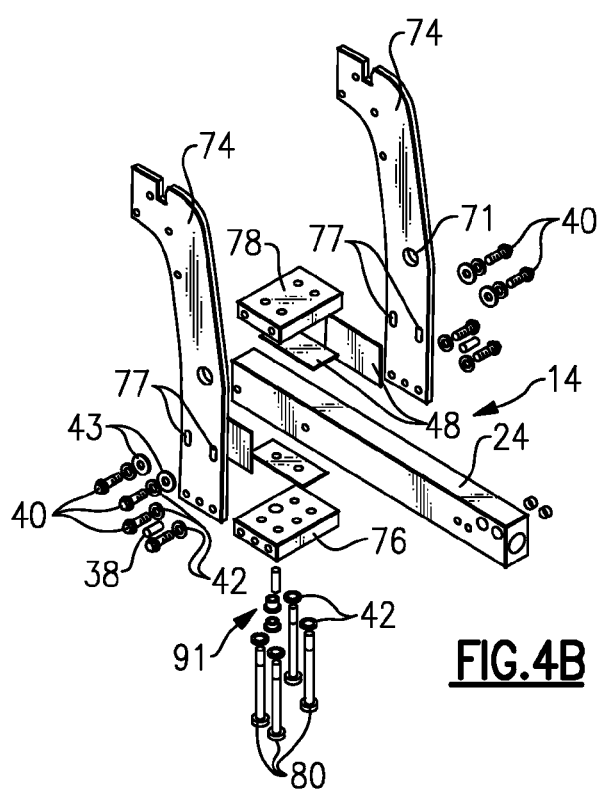

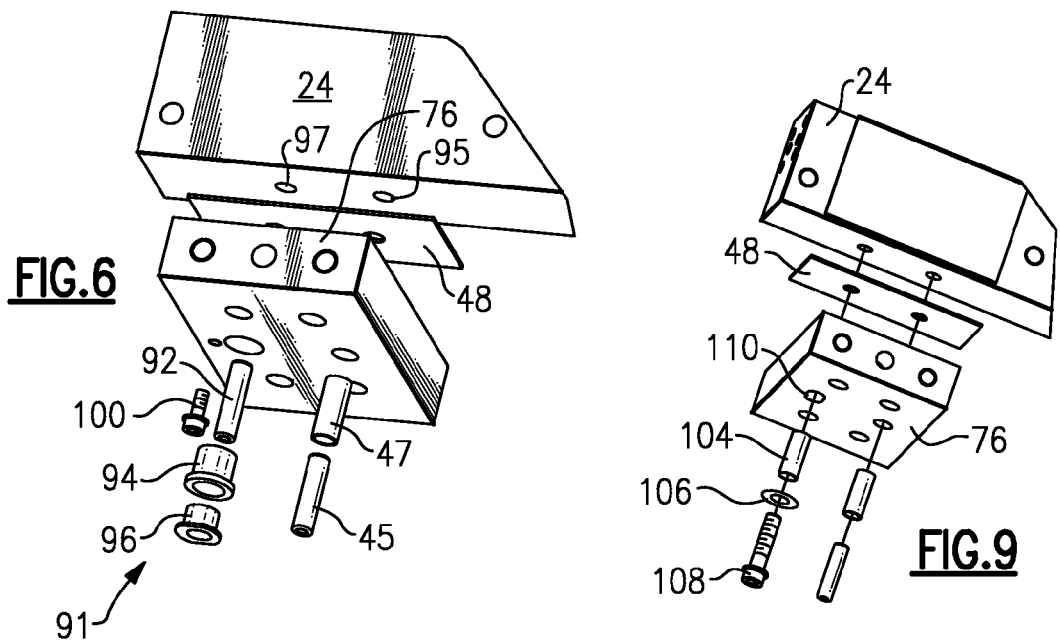
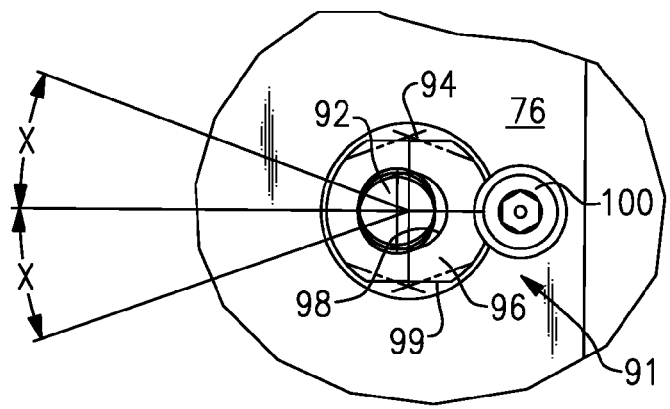
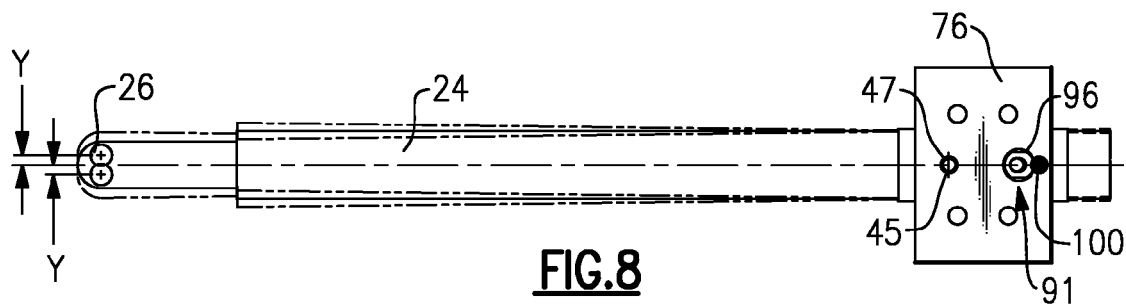

---

MODULAR RESISTANCE WELD GUN

BACKGROUND OF THE INVENTION

This application relates to resistance welding guns. More particularly, the application relates to arm assemblies that support electrode arms.

Resistance welding guns are used in the automotive industry, for example, for spot welding a workpiece. Opposing arm assemblies are actuated to engage the workpiece with electrode arms provided on the arm assemblies. Numerous resistance welding guns are typically employed to spot weld a vehicle body, for example. However, the welding guns must be customized to reach the area to be spot welded, which results in many unique parts for the arm assemblies.

A modular design approach previously has been applied to resistance welding guns. This design approach focused on mass producing the welding gun body, which includes the actuator, transformer and arm assemblies (excluding the electrode arms). The electrode arms were unique to reach the area to be spot welded. The electrode arms are commonly made of high strength copper or aluminum alloys that are very expensive and may be difficult to fabricate into complex shapes. This is particularly problematic since the electrode arms are perishable due to the mechanical and thermal loads to which they are subjected during welding operations. As a result, while the cost of the welding gun bodies has dropped, the high cost of the electrode arms has offset the gains.

Furthermore, prior art modular resistance welding guns have been expensive in that they have utilized many high tolerance machined components to ensure alignment between opposing electrode ends. In the event of a misalignment of the electrode ends in the field, for example due to a crash, time consuming and costly repairs in the field must be employed to restore electrode alignment.

What is needed is improved modular resistance welding guns that reduce the overall cost of the gun assembly. Moreover, a modular welding gun is needed that provides improved alignment between the electrodes while reducing the high tolerance machining typically required of the gun components.

SUMMARY OF THE INVENTION

A resistance welding gun is provided that includes an arm assembly having spaced apart plates, which are shaped to provide electrodes access to area to be welded. First and second spaced apart blocks interconnect the plates and extend between the plates in a first direction. The first and second blocks are machined to provide a desired spacing between the plates. An electrode arm is arranged between the plates and blocks and supports an electrode end having a replaceable cap, in one example. The electrode arm has a quadrilateral cross-section in a plane including the first and second directions.

A clamping device applies a clamping load in a second direction transverse to the first direction to secure the electrode arm between the blocks. In one example arrangement, the clamping device is provided by a wedge assembly. In another example arrangement, a movable block is secured about the electrode arm using clamping fasteners supported by a fixed block.

In one example arrangement, a cradle is arranged between and interconnected to the plates. The cradle supports an actuator by trunnion pins extending into the actuator. In one example, the plates include a notch having a flat wall. The trunnion pins are received in the notches and include a flat that cooperates with the flat wall to prevent rotation of the trunnion pin relative to the plates. In this arrangement, the notch in the plate also acts to retain the trunnion pin.

Lateral alignment of the opposing electrode arms is provided. In one example, this is achieved by a simple clamping arrangement. In the other example, the electrode arm adjustment is achieved in a controllable fashion by a movable adjustment assembly. A pivot pin interconnects the block and an electrode arm for permitting rotation of the electrode arm relative to the block about the pivot pin. The adjustment assembly includes an adjustment member that is rotated to turn the electrode arm about the pivot pin and laterally move an end of the electrode arm to a desired position.

These and other features of the application can be best understood from the following specification and drawings, the following of which is a brief description.

BRIEF DESCRIPTION OF THE DRAWINGS

FIGS. 1a-1c illustrate three example modular resistance welding guns.

FIGS. 2a-2b illustrate an upper arm assembly according to the example shown in FIG. 1a.

FIG. 3 is a perspective view of a pivot block used in supporting the upper arm assembly shown in FIGS. 2a-2b.

FIG. 4a-4b are perspective views of a lower arm assembly according to the example shown in FIG. 1a.

FIG. 5 is an enlarged perspective view of a portion of the upper and lower arm assemblies in the area of an actuator according to the example shown in FIG. 1a.

FIG. 6 is an exploded perspective view of an adjustment device provided on the lower arm assembly shown in FIGS. 4a-4b for obtaining electrode alignment.

FIG. 7 is an enlarged bottom elevational view of the adjustment device shown in FIG. 6.

FIG. 8 is a bottom view of a portion of the lower arm assembly illustrating the adjustment device shown in FIGS. 6 and 7.

FIG. 9 is another example of the lower electrode arm.

FIG. 10 illustrates a spacer.

DETAILED DESCRIPTION OF THE PREFERRED EMBODIMENT

Example resistance welding guns are shown at 10, 210, 310, respectively, in FIGS. 1a-1c. Similar components between the Figures are referenced using numerals in multiples of 100. FIG. 1 illustrates a large pinch-style welding gun. FIG. 1b illustrates a small modular pinch-style welding gun. FIG. 1c illustrates a modular scissor-style welding gun.

Referring to FIG. 1a, the welding gun assembly 10 includes upper and lower arm assemblies 12, 14. The use of the terms "upper" and "lower" are exemplary only and are not intended to be limiting. An actuator 16 actuates the upper and lower arm assemblies 12, 14 relative to one another about a common pivot A to move opposing electrode ends 26 into engagement with a work piece to be welded. The electrode ends 26 typically include replaceable welding caps. The actuator 16 can be a hydraulic or pneumatic cylinder, or a servo-electric actuator, for example.

A bracket 20 is supported by a transformer 18 in the example shown. The bracket 20 pivotally supports the upper and lower arm assemblies, 12, 14 at the common pivot A in the example. In one example, the actuator 16 is pivotally supported by the lower arm assembly 14 at an actuator pivot B. The actuator 16 includes a portion, in one example a rod 68 (FIG. 5), pivotally supported at an axis C provided by the upper arm assembly 12. In operation, the rod 68 is extended to close the upper and lower arm assemblies 12, 14 about the work piece for the example shown.

The upper and lower arm assemblies 12, 14 include upper and lower electrode arms 22, 24. In the example, the upper and lower electrode arms 22, 24 are relatively small and of simple construction as compared to the prior art. The upper and lower electrode arms 22, 24 can be cut and machined from a wrought copper bar stock or plate, for example, and may have dimensional variation or distortion that would not be acceptable in the prior art. The adjustment provided in the design of the arm assemblies thus enables a reduction in the cost of replacing the electrode arms over the welding gun's life. In one example, the electrode arms 22, 24 have a quadrilateral cross-section in a plane P. Of course, the electrode arms could have any desired cross-section and may incorporate a more complex shape, if desired on some applications.

Shunts 28 electrically connect the transformer 18 to the upper and lower electrode arms 22, 24 to transmit current to the electrodes ends 26. In one example, a stabilizing cylinder 30 is interconnected between the lower arm assembly 14 and the bracket 20 to stabilize the position of the upper and lower arm assemblies 12, 14 during operation of the welding gun 10. The equalizing cylinder 30 is used to position the lower arm assembly 14 between fixed and floating points that allow the electrode ends 26 to engage the workpiece, which may be mislocated or moved during the welding operation.

Should the equalizing cylinder 30 not be required for a particular resistance welding application, a single fastener can be used in place of the equalizing cylinder 30 rod mount, to rigidly connect the lower arm assembly 14 to the bracket 20. In one example, the equalizing member can be a fastener rigidly securing the plate 74 to the bracket 20, as shown in FIG. 10. In this adaptation, a spacer 33 is provided with a thickness that corresponds to the gap between the lower arm assembly 14 and the bracket 20. The equalizing member 31 is received in a hole in the plate 74 and extends into the bracket 20. The spacer 33 corresponds to the width or gap between the plate 74 and bracket 20. Thus, both methods of operation are supported with the same configuration of the lower arm assembly 14 and bracket 20, and the change can be made easily by the addition of removal of the equalizing cylinder.

The example modular welding guns can incorporate relatively simple, inexpensive upper and lower electrode arms 22, 24. The flexibility is provided, in part, by simple, flat side plates that support the electrode arms and by blocks used to precisely space the side plates. By comparison, the material and machining costs of the side plates and blocks relative to prior art electrode arms is much cheaper. As a result, a significant cost savings can be realized when using the example welding guns while achieving a flexible, modular design.

The example upper arm assembly 12, as illustrated in FIG. 1a, is shown in more detail in FIGS. 2a-2b. The upper arm assembly 12 includes spaced apart side plates 32 that are cut in a desired shape for the particular application. In one example, the side plates are cut from metal sheets using laser, plasma or waterjet cutting, for example.

A block 34 is machined to a desired width to accommodate the upper arm 22 and achieve a desired spacing between the side plates 32. However, the upper electrode arm 22 does not have to be accurately machined, which will be appreciated relative to the clamping devices discussed below. The side plates 32 include holes 36 for receiving fasteners 40 threadingly received in apertures in the block 34 to secure them to one another in a first direction J. In one example, washers 42 are arranged between the fasteners 40 and side plates 32. Dowels 38 are used to locate the side plates 32 relative to the block 34. An isolator bushing 46 is received in an aperture 47 in the upper electrode arm 22. A dowel 44 locates the upper electrode arm 22 in a transverse direction L relative to the block 34 while still permitting the electrode end 26 to be repositioned in the lateral direction J.

Insulator sheets 48 are used to electrically isolate the upper electrode arm 22 relative to the side plates 32 and block 34. The insulator sheets 48 may be affixed to upper electrode arm 22 with adhesive or other suitable means to ensure they remain in place, since compressive forces may not be present due to the relatively loose tolerances between the upper electrode arm 22 and the side plates 32. The insulator sheets 48 can be constructed from micarta, fiberglass or any other suitable material.

A wedge assembly 49 provides a clamping device that is used to clamp and lock the upper electrode arm 22 in a second direction K once in a desired position relative to the side plates 32 and block 34. A first wedge portion 50 is secured to the side plates 32 in a similar manner to that described above relative to block 34. The first wedge portion 50 provides desired spacing between the side plates 32. A second wedge portion 52 is arranged between the first wedge portion 50 and the upper electrode arm 22. The first and second wedge portions 50, 52 include complimentary inclined surfaces 54. Clearance is provided between the second wedge portion 52 and the side plates 32 to permit sliding movement of the second wedge portion 52.

In operation, a face 56 on the second wedge portion 52 is loaded in a third direction L using shoulders 58 of fasteners secured to the first wedge portion 50. In one example, the first, second and third directions are approximately 90 degrees apart. The fasteners are tightened to move the second wedge portion 52 along the inclined surface 54 on the first wedge portion 50 to clamp the upper electrode arm 22 between the block 34 and the first wedge portion 50. In this manner, the height of upper electrode arm 22 need not be accurately machined and can be secured in place once a desired orientation is achieved.

Referring to FIG. 2a, the upper arm assembly 12 includes a first portion 60 that is secured to a recessed area 63 of a pivot block 64 (FIG. 3) using fasteners (not shown). The pivot block 64 is supported by and rotates relative to bracket 20 about the common axis A. A second portion 62 is secured to a portion of the actuator 16, best shown in FIG. 5, using fasteners (not shown).

The lower arm 14 is shown in FIGS. 4a-4b. A fixed block 76 is secured between opposing side plates 74 using fasteners 40 in the first direction J. A movable block 78 provides a clamping device and is arranged between the side plates 74. The lower arm 24 is arranged between the fixed and movable blocks 76, 78 and is clamped in place. The side plates 74 include slots 77 that receive the fasteners 40 which are secured to the movable block 78. Clamping fasteners 80 extend through the fixed block 76 on either side of the lower arm 24 and are threadingly received in the movable block 78 and secured in the second direction K.

In operation, to retain the lower electrode arm 24 in a desired position, the clamping fasteners 80 are tightened to apply a clamping load in the second direction K to the lower electrode arm 24. The slots 77 permit vertical movement of movable block 78 (in the orientation shown). Once the lower electrode arm 24 is clamped in a desired position by the fixed and movable blocks 76, 78, the fasteners 40 within the slot 77 can be tightened to retain the movable block 78 in its position.

Similar to the upper arm assembly 12, insulators 48 are arranged about the lower electrode arm 24 to electrically isolate the lower electrode arm 24 relative to the side plates 74 and fixed and movable blocks 76, 78. Again, the lower electrode arm 24 does not need to be precisely machined when using the clamping device.

Referring to FIG. 5, an end 83 of the actuator 16 is supported in a U-shaped cradle 82, in one example. The cradle 82 provides desired spacing between the side plates 32 and is secured thereto by fasteners (not shown). The end 83 is pivotally supported by the trunnion pins 84 extending inserted into opposing sides of the end 83 to provide the axis B. The cradle 82 ensures alignment of the two trunnion pins 84 irrespective of the machining accuracy or alignment of the side plates. Optimum alignment contributes to smooth closing and minimizes the requirements for maintenance of the trunnion pins or actuator bushings. The end 83 supports the rod 68, which is extended when the actuator 16 is actuated to close to the electrode end 26 about the work piece.

An upper portion of each side plate 74 includes a notch 88 that receives an end of the trunnion pin 84. A flat wall 90 provided by the notch 88 cooperates with a flat 86 in the trunnion pin 84 to prevent its rotation, which would create wear between the side plates 74 and the trunnion pins 84. Moreover, the trunnion pins 84 cannot back out of the end 83 and free the actuator 16. Thus, supplemental components commonly used to retain such trunnion pins, such as retainer plates and fasteners, are not required.

In one example, spacers 70 are arranged about an end of the rod 68 between the side plates 32 of the upper arm 12. A pin (not shown) supports the rod end relative to the upper arm assembly 12. Caps 72 are secured to the side plates 32 to capture the pin.

In one example, the lower electrode arm 24 can be laterally adjusted relative to the upper electrode arm 22 to provide alignment between the electrode ends 26. The adjustment assembly 91 is best illustrated in FIGS. 6-8. The lower electrode arm 24 is located relative to the fixed block 76 by a pivot pin 45 and isolator bushing 47 received in a corresponding hole 95 of the lower electrode arm 24. The lower electrode arm 24 can be rotated about the pivot pin 45 at a desired angle X (FIG. 7). An adjustment pin 92 is received in a corresponding hole 97 in the lower electrode arm 24. An isolator bushing 94 is received in a hole in the fixed block 76. An adjustment member 96 receives an end of the pin 92 and is arranged within the bushing 94.

Referring to FIG. 7, the adjustment member 96 includes an eccentric, cam-like slot 98 that may be elongated (shown) or arcuate, for example. The adjustment member 96 includes flats 99 that can be manipulated by a tool to rotate the adjustment member 96 to achieve a desired angle X for the lower electrode arm 24. The orientation of the flats 99 can provide a visual indication of the adjusted position of the lower electrode arm 24.

In operation, the clamping fasteners 80 and fasteners 40 secured to the movable block 78 would be loosened to permit adjustment of the lower electrode arm 24 using the adjustment member 96. The angle X corresponds to a distance Y at the electrode end 26, which corresponds to the lateral adjustment of the lower electrode arm 24 to achieve alignment of opposing electrode ends 26. A securing member 100, such as a threaded fastener, is supported by the fixed block 76 to clamp the adjustment member 96 to the fixed block 76 once the desired arm adjustment has been achieved. Afterwards the movable block 78 can be tightly secured relative to the side plates 74 and fixed block 76. An isolator washer (not shown) is arranged between the securing member 100 and adjustment member 96.

Another example of securing the lower electrode arm 24 is shown in FIG. 9. The fixed block 76 includes an arcuate slot 110 that receives an insulator bushing 104. The insulator bushing 104 is received in a hole in the lower electrode arm 24. A fastener 108, such as a bolt, is received in the insulator bushing 104 and threadingly secured to the lower electrode arm 24 within the corresponding hole. An insulating washer 106 is arranged between the fastener 108 and fixed block 76. The arcuate slot 110 accommodates lateral repositioning of the lower electrode arm 24. In the example, the fastener 108 provides a securing member that clamps the lower electrode arm 24 in a desired position.

Although preferred embodiments of this application have been disclosed, a worker of ordinary skill in this art would recognize that certain modifications would come within the scope of the claims. For that reason, the following claims should be studied to determine their true scope and content.

What is claimed is:

1. A welding gun arm assembly comprising:
   spaced apart plates;
   spaced apart first and second blocks interconnected to and extending from and between the plates in a first direction;
   an electrode arm arranged between the plates and blocks, the electrode arm supporting an electrode end; and
   a clamping device configured to apply a clamping load in a second direction transverse to the first direction and securing the electrode arm between the blocks.

2. The assembly according to claim 1, wherein the first and second blocks each include a width that provides a desired spacing between the plates.

3. The assembly according to claim 2, wherein the plates and the first and second blocks are discrete from one another, and comprising fasteners securing the plates and first and second blocks to one another and located within through aligned holes in the plates and the first and second blocks.

4. The assembly according to claim 1, wherein the electrode arm has a quadrilateral cross-section in a plane including the first and second directions.

5. The assembly according to claim 4, wherein electrical insulators are arranged between the arm and the plates and first and second blocks.

6. The assembly according to claim 1, wherein the clamping device includes a wedge assembly having first and second wedge portions, the first wedge portion providing one of the first and second blocks, the first and second wedge portions including inclined surfaces configured to cooperate with one another to provide the clamping load.

7. The assembly according to claim 6, wherein the second wedge portion includes a face, and a fastener secured to the first wedge portion configure to coact with the face to slide the included surface relative to one another and move the second wedge in a third direction transverse to the first and second directions.

8. The assembly according to claim 1, wherein the clamping device includes clamping fasteners extending in the second direction, and the plates includes slots extending in the second direction receiving block fasteners secured to the second block for permitting movement of the second block relative to the first block.

9. The assembly according to claim 1, comprising a pin extending in the second direction interconnecting one of the first and second blocks relative to the electrode arm constraining the electrode arm in a third direction transverse to the first and second direction.

10. A welding gun arm assembly comprising:
    a block secured to a plate having a pivot axis;

an electrode arm supported on the block and configured to move together about the pivot axis in a first direction during a welding operation;

a pivot pin spaced from and arranged transverse to the block and interconnecting the block and electrode arm for permitting rotation of the electrode arm relative to the block in a lateral direction transverse to the first direction; and a securing member for constraining the electrode arm against further rotation once a desired position has been established.

11. The assembly according to claim 10, comprising an insulator bushing received in a hole in the block, the pivot pin extending through the insulator bushing into the electrode arm.

12. The assembly according to claim 10, wherein the securing member includes an adjustment pin secured to the electrode arm, and an adjustment member supported by the block and including a slot receiving adjustment pin, the adjustment member rotatable relative to the block for moving the adjustment pin with the slot to laterally reposition the electrode arm in the lateral direction an electrode end opposite the block.

13. The assembly according to claim 12, wherein the adjustment assembly includes a lock secured to the block and clamping the adjustment member in a desired position against the block.

14. The assembly according to claim 12, wherein the adjustment assembly includes a bushing arranged between the block and the adjustment member, and the securing member includes an insulated fastener received in a hole in the block and into the electrode arm.

15. A welding gun arm assembly comprising:
spaced apart discrete plates;
a cradle arranged between and interconnecting the plates;
an actuator having an end and a rod extendable relative to the end, the end supported by the cradle; and
trunnion pins that are received by the cradle and plates for pivotally supporting the actuator relative to the plates, wherein the cradle is generally U-shaped, the trunnion pins engage opposing sides of the end.

16. The assembly according to claim 15, wherein the trunnion pin is fixed against rotation relative to the plates by a flat provided on a cylindrical surface of the trunnion pin.

17. The assembly according to claim 16, wherein the plates each include notches that cooperate with the flats for preventing motion of the trunnion pin relative to the plates.

18. A welding gun assembly comprising:
a transformer;
brackets for supporting the electrode arm assemblies relative to the transformer;
electrode arm assemblies consisting of spaced apart discrete plates; and
an equalizing member interconnecting at least one of the plates to the bracket to prevent equalizing rotation of the electrode arm assembly.

19. The assembly according to claim 18, wherein the equalizing member is a fastener received in a hole in the plate, extending into the bracket, and a spacer between the plate and bracket corresponding to a gap between them.

20. The assembly according to claim 10, comprising spaced apart plates, and spaced apart first and second discrete blocks interconnecting to and extending from and between the plates in the lateral direction, and fasteners extending in the first direction and securing the first and second blocks to one another about the electrode arm and configured to retain the desired position.

* * * * *